US009238963B2

(12) United States Patent
Frey et al.

(10) Patent No.: US 9,238,963 B2
(45) Date of Patent: Jan. 19, 2016

(54) SYSTEMS AND METHODS FOR DETECTING PHASES IN MULTIPHASE BOREHOLE FLUIDS

(75) Inventors: Mark T. Frey, Sugar Land, TX (US);
Keith A. Moriarty, Houston, TX (US);
Devin Rock, McMurray, PA (US);
Robert Utter, Sugar Land, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 845 days.

(21) Appl. No.: 13/251,578

(22) Filed: Oct. 3, 2011

(65) Prior Publication Data

US 2012/0111561 A1 May 10, 2012

Related U.S. Application Data

(60) Provisional application No. 61/390,487, filed on Oct. 6, 2010.

(51) Int. Cl.
*E21B 47/10* (2012.01)

(52) U.S. Cl.
CPC .............. *E21B 47/102* (2013.01); *E21B 47/10* (2013.01)

(58) Field of Classification Search
CPC ...... E21B 47/10; E21B 47/065; E21B 49/087
USPC ........ 166/250.01, 250.03; 73/152.18, 152.05; 374/136
See application file for complete search history.

(56) References Cited

U.S. PATENT DOCUMENTS

| 3,455,158 | A | | 7/1969 | Richter, Jr. et al. |
| 3,656,344 | A | * | 4/1972 | Johns .................... 73/152.12 |
| 3,745,822 | A | * | 7/1973 | Pierce et al. ........... 73/152.12 |
| 3,785,446 | A | * | 1/1974 | Fertl et al. .................. 175/50 |
| 4,575,261 | A | | 3/1986 | Berger et al. |
| 4,765,193 | A | | 8/1988 | Holden et al. |
| 4,881,406 | A | | 11/1989 | Coury |
| 5,531,112 | A | * | 7/1996 | Young et al. ........... 73/152.02 |
| 6,176,323 | B1 | | 1/2001 | Weirich et al. |
| 6,325,149 | B1 | | 12/2001 | Dobson, Jr. et al. |
| 2006/0054354 | A1 | * | 3/2006 | Orban ........................ 175/40 |
| 2008/0041594 | A1 | * | 2/2008 | Boles et al. ............ 166/305.1 |
| 2008/0066905 | A1 | * | 3/2008 | Aivalis et al. ......... 166/250.01 |

(Continued)

OTHER PUBLICATIONS

Stein, Middle East Well Evaluation Review, No. 2, 1998, p. 35-47 "Coiled for Oil".*

(Continued)

*Primary Examiner* — Shane Bomar
*Assistant Examiner* — Steven MacDonald
(74) *Attorney, Agent, or Firm* — Kimberly Ballew

(57) ABSTRACT

A method detects at least one phase of multiphase borehole fluids within a borehole. The method has a step of providing coiled tubing connected to a top end of a bottom hole assembly having a sensor configured to detect a property associated with the multiphase borehole fluids. Further, the method has a step of positioning the sensor adjacent to a first phase of the multiphase borehole fluids by rotating the bottom hole assembly or a portion of the bottom hole assembly. Moreover, the method has the steps of detecting a first measurement with the sensor as the sensor rotates and determining a fractional amount of at least one phase of the multiphase borehole fluids.

10 Claims, 4 Drawing Sheets

(56) References Cited

U.S. PATENT DOCUMENTS

2009/0309602 A1* 12/2009 Wang ............................ 324/355
2010/0018770 A1*  1/2010 Moriarty et al. ................ 175/45
2011/0088894 A1*  4/2011 Atwood et al. .......... 166/250.01
2012/0158307 A1*  6/2012 Jay et al. ......................... 702/11

OTHER PUBLICATIONS

Search report for the equivalent Saudi Arabian patent application No. 111320826 emailed via Abu-Ghazaleh Intellectual Property (AGIP), Member of Talal Abu-Ghazaleh Organization on Jul. 6, 2014.

* cited by examiner

SYSTEMS AND METHODS FOR DETECTING PHASES IN MULTIPHASE BOREHOLE FLUIDS

CROSS-REFERENCE TO RELATED APPLICATIONS

The present application seek priority to U.S. patent application No. 61/390,487 filed Oct. 6, 2010, the entirety of which is incorporated by reference.

BACKGROUND OF THE INVENTION

A wellhole or borehole (hereinafter "the borehole") is generally drilled into the Earth to recover natural deposits of hydrocarbons and/or other desirable materials trapped in a subsurface geological formation (hereinafter "the formation") in the Earth's crust. The borehole is typically drilled using a drilling system having a drill bit attached to a lower end of a the bottom hole assembly (hereinafter "BHA"). The borehole may be drilled to penetrate a reservoir or other subterranean region of the formation (hereinafter "the formation reservoir") that contains the trapped hydrocarbons and/or other materials. As a result, the trapped hydrocarbons and/or materials are released and/or recovered from the formation reservoir via the borehole.

The borehole may be also used for treatment applications and a variety of other well related applications. Often, the drilling system is a directional drilling system that enables an operator to change the direction of drilling into the formation to more effectively access the formation reservoir. One example of the direction drilling system is a coiled tubing drilling system having flexibility that is needed to drill deviated wellbores. Additionally, the coiled tubing drilling system may include a variety of systems and devices, such as, steerable motors, articulated subs, push-the-bit systems to facilitate steering for the directional drilling operations.

Directional drilling operations for the drill bit located at the BHA of the drill string are controlled by the operator which makes real-time drilling decisions based on one or more downhole measurements (hereinafter "measurements"). The measurements are detected by the one or more sensors and/or tools associated with the BHA and/or are sent uphole to be accessed and utilized by the operator. Available coiled tubing drilling systems have proven to be limited in certain applications and are often unable to detect the measurements necessary for the operator to facilitate successful and desirable directional drilling operations. As a result, the directional drilling operations may not be steered and/or positioned at the most productive and/or most desirable location within the formation reservoir. For example, available coiled tubing drilling systems are not able to adequately and successfully detect the necessary measurements associated with and/or based on one or more phases in the multiphase borehole fluids. Coiled tubing drilling may be an advantageous drilling technique for underbalanced drilling because coiled tubing drilling does not require connections and the coiled tubing may be slick which may allow formation fluids produced while drilling to flow into the well.

BRIEF DESCRIPTION OF THE DRAWINGS

So that the above recited features and advantages of the present disclosure can be understood in detail, a more particular description of the invention, briefly summarized above, may be had by reference to the embodiments thereof that are illustrated in the appended drawings. It is to be noted, however, that the appended drawings illustrate only typical embodiments of this disclosure and are therefore not to be considered limiting of its scope, for the invention may admit to other equally effective embodiments.

DETAILED DESCRIPTION

The present disclosure relates to systems and methods for detecting one or more phases in the multiphase borehole fluids within the borehole in the formation. The systems and methods may detect one or more measurements associated with and/or based the one or more phases of the multiphase borehole fluids. Additionally, the detected measurements may be based one or more images of the formation surrounding the borehole. Embodiments of the present disclosure may be utilized during vertical, horizontal and/or directional drilling operations and during underbalanced or overbalanced drilling when the overbalanced condition fails and formation fluids flow into the borehole.

Figure 3:
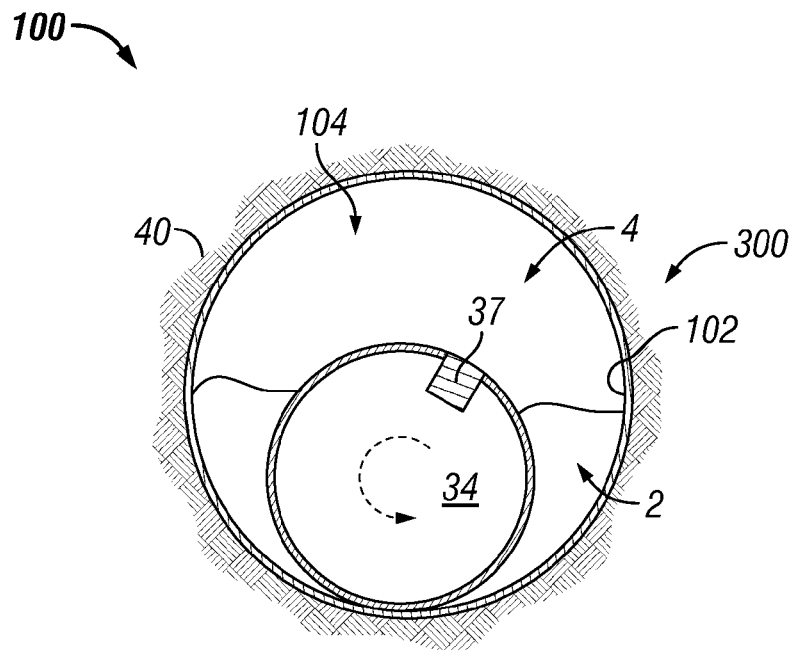
FIG. 3 illustrates a schematic cross-sectional view of the BHA and multiphase borehole fluids in the borehole in an embodiment of the present invention.
Figure 5:
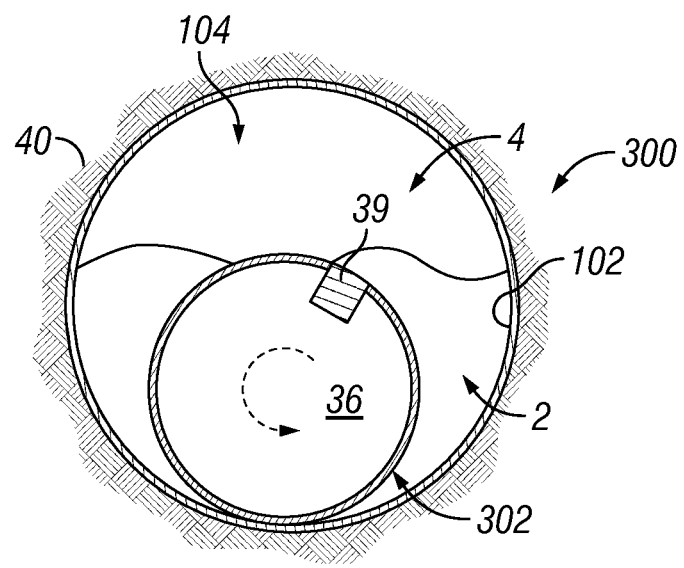
FIG. 5 illustrates a schematic cross-sectional view of the BHA and the multiphase borehole fluids in the borehole in an embodiment of the present invention.
Figure 6:
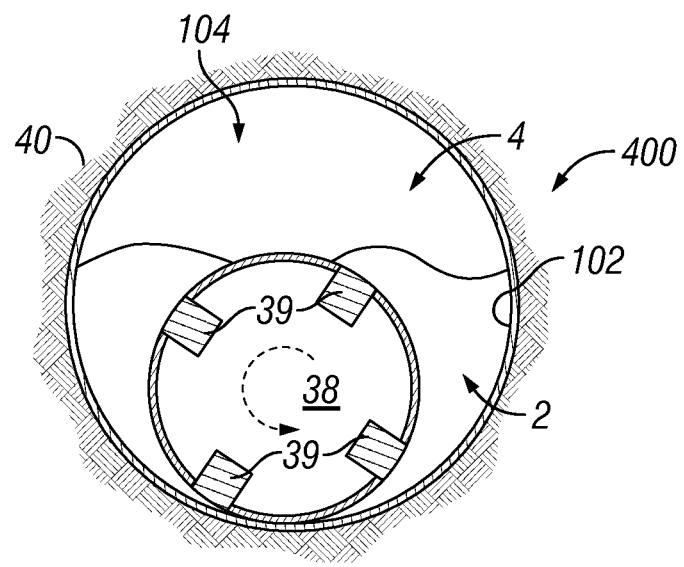
FIG. 6 illustrates a schematic cross-sectional view of the BHA and the multiphase borehole fluids in the borehole in an embodiment of the present invention.

The multiphase borehole fluids may include at least a first phase 2 and a second phase 4 (see FIGS. 3, 5 and 6). In an embodiment, the first phase 2 may comprise drilling fluid, and the second phase 4 may include formation fluid. The drilling fluid may be, for example, water, drilling mud, a fluid, a gas, a gel and/or combinations thereof. The formation fluid may be, for example, gas, hydrocarbons, a fluid and/or combinations thereof. The first phase 2 may be more conductive than the second phase 4 or the second phase 4 may be substantially non-conductive. The present application should not be deemed as limited to a specific embodiment of the drilling fluid and/or the formation fluid and/or to a specific number of phases that may be present in the multiphase borehole fluids. It should be understood that the drilling fluid may be any drilling fluid as known to one of ordinary skill in the art.

Figure 1:
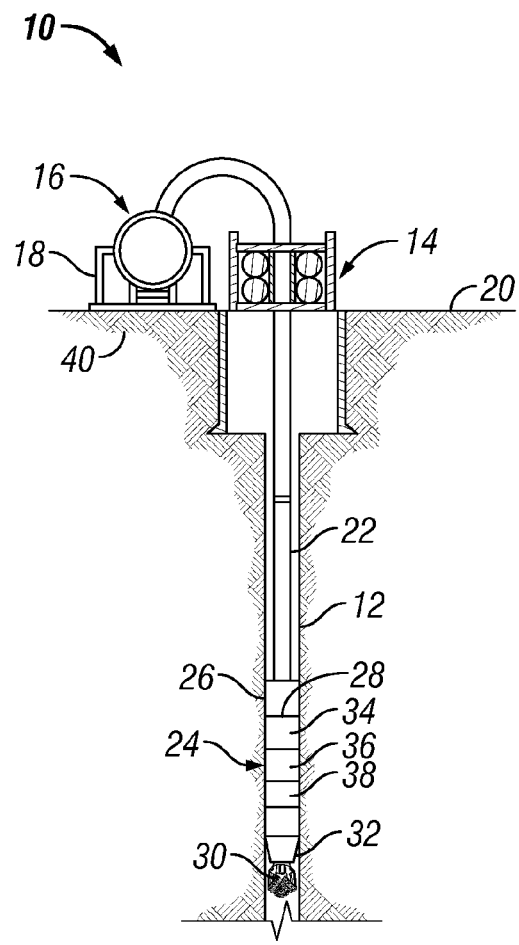
FIG. 1 illustrates a schematic side view of a coiled drilling system positioned in a borehole in an embodiment of the present invention.

Referring now to the drawings wherein like numerals refer to like parts, FIG. 1 schematically illustrates coiled tubing drilling system 10 (hereinafter "the drilling system 10") which may be operated to drill a borehole 12 for use in a well 14. The coiled tubing drilling system 10 may have components, such as, for example, a coiled tubing drilling installation 16 with a coiled tubing rig and injector installation 18 which may be positioned at a surface 20 proximate the top of well 14. It should be understood that the drilling system 10 may include any components as known to one of ordinary skill in the art.

The drilling system 10 generally may have coiled tubing 22 which is connected to the top of the BHA 24. The orienter 26 may be connected near the top or uphole end 28 of the BHA 24. The BHA 24 may include a drill bit 30 driven to form the borehole 12 which may be rotated by a motor 32 or by another suitable driving device (not shown in the drawings). In embodiments, the motor 32 may be a mud motor and/or may be a steerable device, such as, for example, a steerable mud motor. As a result, the motor 32 may be directionally steered and/or controlled to drill the borehole 12, via the drill bit 30, in one or more desired trajectories within or through a formation reservoir 40. It should be understood that the motor 32 or driving device may be any motor or driving device capable of rotating, steering and/or controlling the drill bit 30 as known to one of ordinary skill in the art.

The BHA 24 of the drilling system 10 may include one or more downhole tools and/or sensors 34, 36, 38 (hereinafter "tools 34, 36, 38") for collecting, sensing and/or detecting one or more downhole measurements (hereinafter "measurements") within and/or associated with the borehole 12, the BHA 24 and/or the formation reservoir 40. The tools 34, 36, 38 may contain survey or measurement tools, such as, logging-while-drilling tools (hereinafter "LWD tools") and measuring-while-drilling tools (hereinafter "MWD tools"). Moreover, the tools 34, 36, 38 may store data, process data and/or transmit data, in real-time, uphole to the Earth's surface via one or more telemetry devices and/or systems. It should be understood that the BHA 24 of the drilling system 10 may include any number of downhole tools, downhole sensors and/or other features as known to one of ordinary skill in the art.

The tools 34, 36, 38 may be any device or component for measuring one or more characteristics and/or properties associated with the borehole 12, the formation reservoir 40, the coiled tubing 22 and/or the BHA 24. The tools 34, 36, 38 may, for example, include one or more LWD tools having capabilities for measuring, processing, and storing data and/or information, as well as for communicating with surface equipment. Additionally, the LWD tools may include one or more of the following types of logging devices that measure one or more characteristics and/or properties associated with the borehole 12 and/or the formation reservoir 40: a resistivity measuring device; a directional resistivity measuring device; a sonic measuring device; a nuclear measuring device; a nuclear magnetic resonance measuring device; a pressure measuring device; a seismic measuring device; an imaging device; a formation sampling device; a natural gamma ray device; a density and photoelectric index device; a neutron porosity device; and a borehole caliper device. It should be understood that one or more of the tools 34, 36, 38 may be any LWD tool as known to one or ordinary skill in the skill.

For example, one or more of the tools 34, 36, 38 may be a LWD tool, such as, a real-time reservoir steering tool which may detect, acquire and/or collect the measurements, such as, for example, a temperature sensor 37 (see FIG. 3) and/or one or more resistance sensors 39 (see FIGS. 4-7). The temperature sensor 37 may detect one or more temperature measurements associated with and/or based on the first phase 2 and the second phase 4 (hereinafter "the phases 2, 4") in the multiphase borehole fluids within the borehole 12. The one or more resistance sensors 39 may obtain resistance measurements associated with the phases 2, 4 and/or a surrounding collar 206 (see FIG. 4) of the one or more resistance sensors 39. The temperature measurements and/or the resistance measurements detected by one or more of the tools 34, 36, 38 may be accessed, in real-time, by the operator or a processor 35 (see FIG. 2) at the surface. Based on the temperature measurements and/or the resistance measurements, the operator may evaluate, in real-time, a productivity of the formation reservoir 40 or the borehole 22, an optimization of the wellbore trajectory and/or conduct reservoir steering based on the one or more temperature and/or resistance measurements.

As shown in FIG. 1, the tool 38 may be located adjacent to the drill bit 30, the tool 34 may be located uphole with respect to the tool 38, and the tool 36 may be located in between the tools 34 and 38. Alternatively, the tools 34, 36, 38 may be located in any configuration and/or position along the BHA 24 as necessary for the desired drilling operations. One or more of the tools 34, 36, 38 may include one or more additional components (not shown in the drawings), such as, for example, a turbine, a motion characterization package, one or more telemetry connections, one or more magnets, one or more antennas, one or more wear bands and/or one or more stabilizer. It should be understood that one or more additional components of the tool 34 may be any components capable of collecting and/or obtaining the measurements in the borehole as known to one of ordinary skill in the art.

In embodiments, one or more of the tools 34, 36, 38 may be one or more MWD tools which may include one or more devices for measuring one or more characteristics and/or properties of the drill bit 30 and/or the BHA 24. The MWD tools may include one or more of the following types of measuring devices: a weight-on-bit measuring device; a torque measuring device; a vibration measuring device; a shock measuring device; a stick slip measuring device; a direction measuring device; an inclination measuring device; a natural gamma ray device; a directional survey device; a tool face device; a borehole pressure device; and a temperature device. The MWD tools may detect, collect and/or log data and/or information about the conditions at the drill bit 30, the formation reservoir 40, at a front of the drill bit 30 and/or at a distance around the drill bit 30. It should be understood that one or more of the tools 34, 36, 38 may be any MWD tool as known to one of ordinary skill in the art.

In embodiments, one or more of the tools 34, 36, 38 may include an electronic sensor package and/or a mudflow wellbore telemetry device (not shown in the drawings). The electronic sensor package may detect and/or measure the one or more characteristics and/or properties associated with walls 102 (see FIG. 3) of the borehole 12, the formation reservoir 40, and/or the BHA 24. The telemetry device may communicate with the processor 35 located at the surface 20 by utilizing one or more telemetries, such as, for example, wireline telemetry, fiber-optic telemetry, embedded fiber-optic telemetry, mud pulse telemetry, acoustic telemetry, electromagnetic telemetry and/or real time bidirectional drill string telemetry. It should be understood that the type of telemetry utilized by the telemetry device may be any type of telemetry as known to one of ordinary skill in the art.

Figure 2:
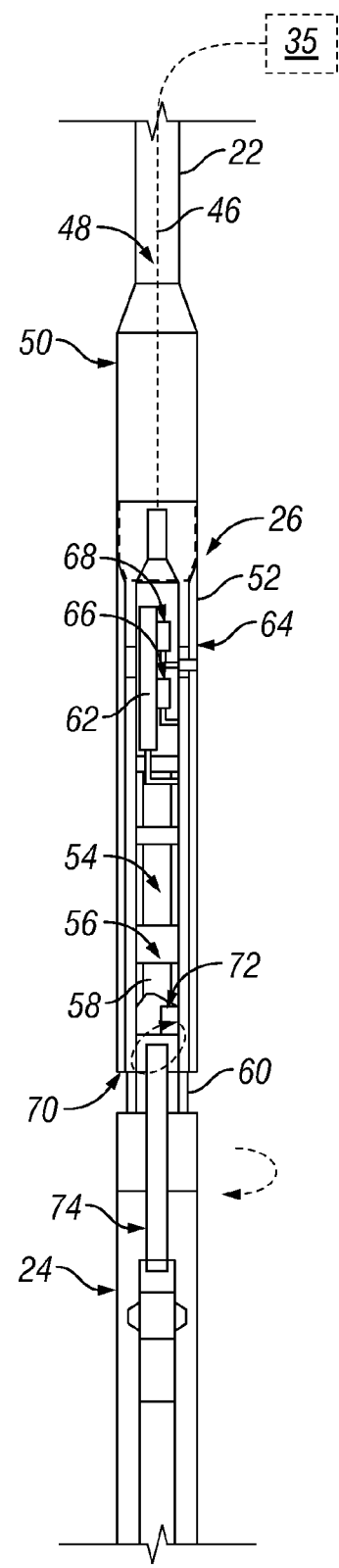
FIG. 2 illustrates a schematic side view of an orientation system of the coiled drilling system coupled to a BHA for directionally drilling the borehole in an embodiment of the present invention.

In embodiments, the drilling system 10 may include an orienter 26 which may be connected to the BHA 24 as shown in FIG. 2. The orienter 26 may receive electrical power via a telemetry system 46 deployed along coiled tubing 22. The telemetry system 46 may be, for example, a wireline telemetry system, a fiber-optic telemetry system, an embedded fiber-optic telemetry system, a mud pulse telemetry system, an acoustic telemetry system, an electromagnetic telemetry system and/or a real-time bidirectional drill string telemetry system.

For example, the telemetry system 46 may be deployed through an interior 48 of coiled tubing 22. Alternatively, the telemetry system 46 may be embedded within the coiled tube 22 and/or within a composite coiled tubing (not shown in the drawings). The coiled tubing 22 and/or the telemetry system 46 may be connected to the orienter 26 via a coiled tubing wireline head 50. In embodiments, the telemetry system 46 may comprise a single or multi-conductor cable to provide power to orienter 36 while also providing high data rate telemetry between the surface 20 and the BHA 24.

The orienter 26 may have an outer housing or body 52 which may enclose a motor 54. Power may be supplied to the motor 54 via the telemetry system 46. The motor 54 may be connected to a gearbox 56 which, in turn, may be connected to BHA 24 via a shaft 58 and an adapter sub 60 to rotate the BHA 24. The motor 54 and/or the gearbox 56 may be selectively actuated within a stationary housing 52 for selectively rotating the BHA 24 or at least one rotatable portion of the BHA 24 in a continuous manner and/or in bidirectional manner, such as, in a clockwise direction or in a counterclockwise direction. The BHA 24 or the at least one rotatable portion of the BHA 24 which may be rotated by the motor 54 and/or the gearbox 56 may comprise one or more of the tools 34, 36, 38. The orienter 26 may rotate the at least one rotatable portion of the BHA 24 which may be located below the orienter 26. The shaft 58 of the orienter 26 may be connected to the BHA 24 and may rotate the BHA 24 or the at least one rotatable portion of the BHA 24. As the result, the BHA 24 or the at least one rotatable portion of the BHA 24 may be rotated at a BHA rotational speed of, for example, about less than (1) one revolution per minute (hereinafter "rpm"), about (1) one rpm, about less than (5) five rpm or about less than (10) ten rpm. In embodiments, the BHA 24 or the at least one rotatable portion of the BHA 24 may be rotated at a BHA rotational speed of about greater than 0.05 rpm. The orienter 26 may include electronics 62 which may be configured to enable the operator at the surface 20 to control and/or adjust the motor 54, to output control signals and/or to receiving data and/or measurements from a sensor system 64, other sensor systems (not shown in the drawings) and/or one or more of the tools 34, 36, 38. The sensor system 64 of the orienter 26 may be configured to provide or transmit data to the surface 20 via the telemetry system 46. In embodiments, the sensor system 64 of the orienter 26 may have pressure sensors, such as an internal pressure sensor 66 and/or an annular pressure sensor 68.

A communication system 70 may connect the orienter 26 and the BHA 24 as shown in FIG. 2. The electronics 62 of the orienter 26 may be configured to receive and/or transmit signals with respect to the communication system 70 over which data is communicated between BHA 24 and the orienter 26. In embodiments, the communication system 70 may be a wireless communication system adapted to transfer data efficiently between BHA 24 and the orienter 26 at, for example, a high data rate. In embodiments, the communication system 70 may be a wireless communication system which may have "short-hop" system with a stationary communication component 72 (hereinafter "the stationary component 72") and a rotating communication component 74 (hereinafter "the rotating component 74"). The stationary component 72 may be mounted in and/or to the orienter 26, and the rotating component 74 may be mounted in and/or to the BHA 24. Utilizing the rotating component 74 and the stationary component 72 may enable transfer of data between the BHA 24 and the orienter 26 during operation of the orienter 26 and rotation of the BHA 24. Depending on the design of the drilling system 10, the communication system 70 may enable high data rate, bidirectional transfer of data between the orienter 26 and a variety of systems in the BHA 24, such as, for example, one or more of the tools 34, 36, 38. Data received by the orienter 26 from the BHA 24 may be transferred from the stationary component 72 to the electronics 62. The data received by the electronics 62 of the orienter 26 may be transmitted to surface 20 via the telemetry system 46. As a result, the transfer of data from the BHA 24 to the orienter 26 and/or surface 20 may be conducted on a real-time basis (hereinafter "in real-time") via the communication system 70 and the telemetry system 46.

By rotating the BHA 24 or the at least one rotatable portion of the BHA 24 at the BHA rotational speed, one or more of the tools 34, 36, 38 of the BHA 24 may detect, acquire and/or obtain measurements and/or images in an azimuthally manner, such as, for example, azimuthal temperature measurements. During traditional rotary drilling, the rotation rate of a typical temperature sensor on the BHA is greater and the typical temperature sensor is unable and incapable to sense azimuthal variations in temperature of the one or more fluids present within the borehole. Moreover, fast rotation rates associated with traditional rotary drilling stir and/or mix the fluids within the borehole which also prevents the typical temperature sensor from detecting the azimuthal variations of temperature for the fluids within the borehole.

The tools 34, 36, 38 of the BHA 24 may detect a measurement in an azimuthally manner and may be transmitted to the surface 20, in real-time, via the communication system 70 and/or the telemetry system 46. The telemetry system 46 may be part of a larger communication system which provides a signal channel between the surface 20 and the BHA 24 and/or the orienter 26. Additionally, the internal pressure sensor 66 and/or the annular pressure sensor 68 of the orienter 26 may detect, acquire and/or collect measurements which may be transmitted to the surface 20 on a real-time via the communication system 70 and the telemetry system 46. In embodiments, the detected measurements may be processed and/or compressed by one or more of the tools 34, 36, 38, the BHA 24 and/or the orienter 26 to produce processed data and/or compressed data, respectively. In embodiments, the compressed data associated with the measurements detected and/or collected one or more of the tools 34, 36, 38 of the BHA 24 and/or by the internal pressure sensor 66 and/or the annular pressure sensor 68 of the orienter 26 may be transmitted to the surface 20 in real-time via the communication system 70 and the telemetry system 46. As a result, the operator and/or the processor 35 at the surface 20 may be capable of making drilling decisions in real-time for the drilling operations based on the data and/or the measurements detected and/or obtained downhole by the BHA 24 and/or the orienter 26. Precise geological steering of the drill bit 30 may be facilitated by the drill system 10 based on the detected measurements and/or compressed data received real-time via the telemetry system 46.

During drilling of the borehole 12, the drilling system 10 pumps the drilling fluid down interior passages of the coil tubing 22, through the orienter 26 and/or the BHA 24 to drive the motor 32 located between the BHA 24 and the motor 30. In embodiments, the drilling system may pump other fluids in to the borehole 12. The other fluids may include, for example, chemicals, cement and/or the like. As a result, the motor 32 may rotate the drill bit 30 to facilitate drilling the borehole 12 and/or may provide power to the BHA 24 and/or one or more of the tools 34, 36, 38 of the BHA 24. The BHA 24 and/or one or more of the tools 34, 36, 38 may be powered by one or more batteries (not shown in the drawings), by one or more turbines (not shown in the drawings) which generate power from drilling fluid flow and/or by the telemetry system 46. It should be understood that the BHA 24 and/or one or more of the tools 34, 36, 38 may be powered by any power source as known to one of ordinary skill in the art.

The drilling fluid returning to the surface 20 may flow uphole or away from the drill bit 30 between the drilling system 10 and walls 102 of the borehole 12 via an annulus 104 as shown in FIG. 3. FIG. 3 illustrates a cross-sectional view of a system 100 whereby the tool 34 of the BHA 24 is located within the walls 102 of the borehole 12. In embodiments, the drilling fluid may be water or water mixed with a gas, such as, for example, nitrogen gas. During uphole movement, the drilling fluid returning to the surface 20 may be located at or may occupy a first portion of the annulus 104 of the borehole 12. The first phase 2 in the multiphase borehole fluids present in the first portion of the borehole 12 may comprise the drilling fluid returning to the surface 20 via the annulus 104 as shown in FIGS. 3, 5 and 6. The second phase 4 in the multiphase borehole fluids may be present in the second portion of the borehole as shown in FIGS. 3, 5 and 6. In embodiments, the borehole may contain the first and second phases and/or one or more additional phases. For example, the borehole may also contain a third phase and/or a fourth phase. The one or more phases present in the multiphase borehole fluids may be, for example, an oil phase, a gas phase, a water phase and/or a nitrogen phase. The present specification should not be deemed as limited to a specific embodiment of the gas which may be incorporated into the drilling fluid.

In embodiments, the drilling operations of the drilling system 10 may be underbalanced whereby the amount of pressure within the formation reservoir 40 is greater than the amount of pressure present within the borehole 12. As a result, formation fluids, such as, for example, gas from the formation reservoir 40 may enter the borehole 12 via the walls 102 of the borehole 12. Having greater pressure than the drilling fluids, the formation fluids entering the borehole 12 from the formation reservoir 40 may push or move the drilling fluids from a second portion of the borehole 12 and into the first portion of the borehole 12. As a result, the formation fluids may be located at or may occupy the second portion of the annulus 104 of the borehole 12. The formation fluids may or may not move uphole towards the surface 30. The second phase 4 in the multiphase borehole fluids present in the second portion of the borehole 12 may comprise the formation fluids in the annulus 104 of the borehole 12 as shown in FIGS. 3, 5 and 6. A fraction of the borehole 12 which may be taken up by the formation fluids at a particular point along the borehole 12 may depends on an amount of influx of the formation fluids below or downhole with respect to the particular point along the borehole 12. The greater the amount of the influx of the formation fluids, then a larger fraction of the borehole 12 may be taken up by the formation fluids. Flow patterns of the formation fluids may or may not be as simple as shown in FIGS. 3, 5 and 6. An exact flow pattern of the formation fluids may depend on the amount of influx of the formation fluids and on an inclination of the borehole.

The formation fluids may have different characteristics and/or properties than characteristics and/or properties of the drilling fluids. In embodiments, a temperature associated with the formation fluids may be less than or greater than a temperature associated with the drilling fluids. For example, if the influx of the formation fluids is a gas, then expansion of the gas formation fluid in the borehole 12 may result in a lower temperature for the influx of formation fluids when compared to the temperature of the drilling fluids. If the drilling fluid is water and is not too deep, then the drilling fluid may have a cooling effect when compared to the formation 40 such that influx of the formation fluids may a higher temperature when compared to the temperature of the drilling fluids. Further, the drilling fluids may have greater or lesser conductivity properties than the conductivity properties of the formation fluids. Still further, the formation fluids may have greater or lesser insulative properties than the insulative properties of the drilling fluids.

As shown in FIG. 3, the tool 34 may include the temperature sensor 37 and may be located and/or may be positioned inside the walls 102 of the borehole 12 adjacent to the formation reservoir 40. The first and second phases 2, 4 of the multiphase borehole fluids may be present in annulus 104 of the borehole 12. In an embodiment, the BHA 24 or the rotatable portion of the BHA may comprise the tool 34 and the temperature sensor 37. The tool 34 of the BHA 24 and the temperature sensor 37 may be rotated by the orienter 26 at the BHA rotational speed, such as, for example, one (1) rpm. As a result, the temperature sensor 37 may be rotated to be in contact with and/or adjacent to each of the phases 2, 4 individually within the borehole 12. For example, the temperature sensor 37 may be positioned adjacent to and/or within the first phase 2 for a first duration of time based on the rotational speed of the BHA 24. As a result, the temperature sensor 37 may detect, acquire and/or obtain first temperature measurements associated with the first phase 2 during the first duration of time. Moreover, the temperature sensor 37 may be rotated and may be positioned adjacent to and/or within the second phase 4 for a second duration of time based on the BHA rotational speed. The temperature sensor may detect, acquire and/or obtain second temperature measurements associated with the second phase 4 during the second duration of time.

The first temperature measurements and the second temperature measurements (hereinafter "the first and second temperature measurements") may be transmitted from the tool 34 to the orienter 26 via the communication system 70 and from the orienter 26 to the surface 20 via the telemetry system 46. The first and second temperature measurements may be processed by the tool 34 and/or the processor 35 at the surface 20, and the temperatures associated with the first and second temperature measurements may be determined. Temperature differences between the phases 2, 4 may also be determined based on the first and second temperature measurements.

Figure 8:
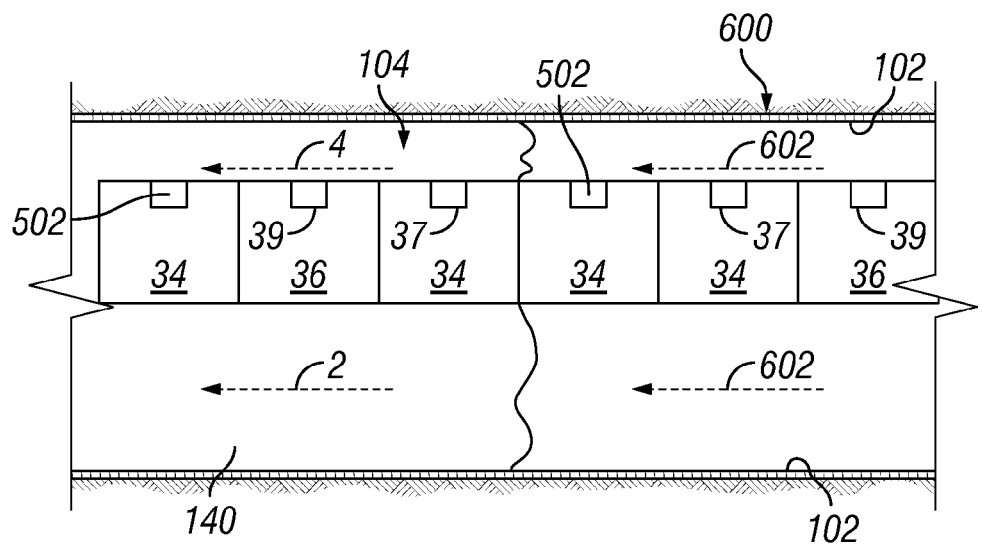
FIG. 8 illustrates a schematic cross-sectional view of the BHA in the borehole in an embodiment of the present invention.

In embodiments, multiple temperature sensors 37 may be positioned and/or located along the length of the BHA 24 and/or the length of one or more of the tools 34, 36, 38 as shown in FIG. 8. Alternatively, each of the tools 34, 36, 38 may have a temperature sensor 37. The multiple temperature sensors 37 may detect, acquire and/or obtain the multiple temperature measurements along the length of the BHA 24 and/or the length of one or more of the tools 34, 36, 38. The multiple temperature measurements may be transmitted uphole to the orienter 26 via the communication system 70 and to the surface 20 via the telemetry system 46. The multiple temperature measurements may be indicative of amounts of and/or fractions of the phases 2, 4 in the borehole 12 along the length of the BHA 24 and/or along the length of one or more of the tools 34, 36, 38. The measurements may be analyzed or processed to determine the amounts and/or fractions of the phases 2, 4. For example, the temperature measurements may be compared with a model based on a depth or location of the tools 34, 36, 38, a temperature of the drilling fluid, a pumping rate of the drilling fluid, a composition of the formation fluid (if known) and/or other parameters that will be appreciated by those having ordinary skill in the art.

Figure 4:
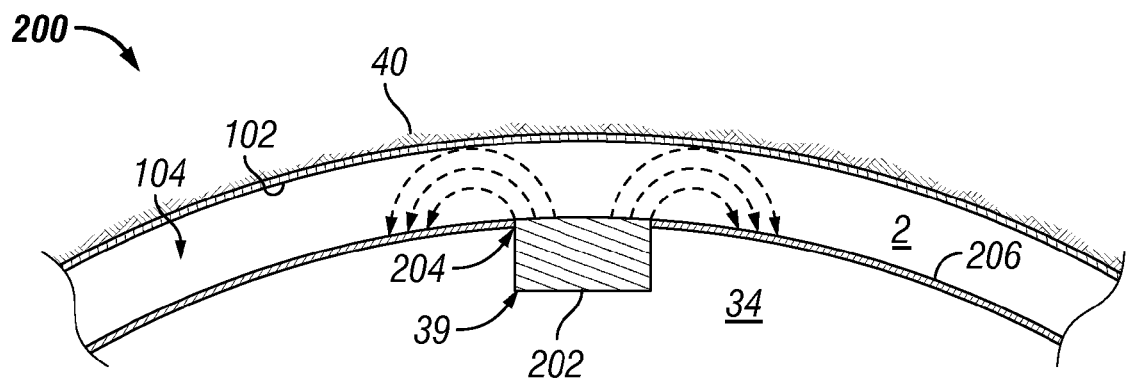
FIG. 4 illustrates a schematic cross-sectional view of the BHA in the borehole in an embodiment of the present invention.

FIG. 4 illustrates a cross-sectional view of a system 200 comprising the tool 36 having a resistivity sensor 39 which may be positioned and/or located within the walls 102 of the borehole 12. The resistivity sensor 39 at least may comprise an electrode 202 which may be separated from the tool 36 by an insulating gap 204. The electrode 202 may be adapted to be sensitive to a resistivity of at least one of the phases 2, 4 of the multiphase borehole fluids around the electrode 202. To obtain a resistivity measurement via the resistivity sensor 39, a voltage difference may be applied between the electrode 202 and the tool 36. A resulting current may flow between the electrode 202 and a surrounding collar 206 of the tool 36. The resulting current may be measured by the resistivity sensor 39. If a conductive fluid may be present and adjacent to the electrode 202 current may flow between the electrode 202 and the collar 206. In an embodiment, the drilling fluid may be the first phase 2 and may be water-based. In such an embodiment, the conductivity of the first phase 2 may be higher than the second phase 4, which may comprise a less or essentially non-conductive formation fluid, such as a gas. If a lesser conductive fluid, non-conductive fluid (i.e., gas) and/or an insulating fluid is present and/or positioned between the electrode 202 and the collar 206, then lesser current or substantially no current may flow between the electrode 202 and the collar 206. As a result, the resistivity sensor 39 may determine that non-conductive fluids, such as, formation fluids, a gas, and/or the second phase 4 may be presence in the multiphase borehole fluids as the as shown in FIGS. 3, 5 and 6. Moreover, the tool 36 and/or resistivity sensor 39 may detect formation cuttings 302 (see FIG. 5) in the multiphase borehole fluids based on the amount of resistivity of the first phase 2 and the formation cuttings 302 detected by the resistivity sensor 39. As a result, the presence of formation cuttings 302 may be detected and/or determined by the tool 36 and/or the resistivity sensor 39.

FIG. 5 shows a system 300 having the tool 36 with the resistivity sensor 39, and FIG. 6 shows a system 400 having the tool 38 with more than one resistivity sensor 39. The tools 36 and 38 may be located and/or positioned within the borehole 12 whereby the phases 2, 4 of the multiphase borehole fluids may also be present within annulus 104 of the borehole 12. The tool 36 as shown in FIG. 5 may be rotated, and the tool 38 as shown in FIG. 6 may be stationary.

In an embodiment shown in FIG. 5, the BHA 24 or the at least one rotatable portion of the BHA 24 may comprise the tool 36 and the resistivity sensor 39. The tool 36 of the BHA 24 and the resistivity sensor 39 may be rotated by the orienter 26 at the BHA rotational speed. As a result, the resistivity sensor may be rotated to be in contact with and/or adjacent to each of the phases 2, 4 individually within the borehole 12. For example, the resistivity sensor 39 may be positioned adjacent to and/or within the first phase 2 for a first duration of time based on the BHA rotational speed. As a result, the resistivity sensor 37 may detect, acquire and/or obtain first resistivity measurements based on an amount of current flowing between the electrode 202 and the collar 206 through the first phase 2. Moreover, the resistivity sensor 39 may be rotated and may be positioned adjacent to and/or within the second phase 4 for a second duration of time based on the BHA rotational speed. The resistivity sensor 39 may detect, acquire and/or obtain second resistivity measurements based on an amount of current flowing between the electrode 202 and the collar 206 through the second phase 4. In an embodiment where the second phase 4 comprises a substantially non-conductive drilling fluid, the resistivity sensor 39 may not receive any measurable current flowing or at least a substantially less amount of current flowing between the electrode 202 and the collar 206 through the second phase 4.

In FIG. 6, the tool 38 may more than one resistivity sensor 39, such as, for example, an array of resistivity sensors 39 which may be positioned and/or located around a circumference or a perimeter of the tool 38. Each resistivity sensor 39 within the array may be equally spaced around the circumference or a perimeter of the tool 38. As a result, one or more of the resistivity sensors 39 of the tool 38 may be adjacent to and/or in contact with the first phase 2 of the multiphase borehole fluids within the borehole 12. The resistivity sensors 39 in contact with the first phase 2 may detect, acquire and/or collect first resistivity measurements based on current that may be flowing between the electrode 202 and the collar 206 through the first phase 2. Additionally, one or more resistivity sensors 39 of the tool 38 may be adjacent to and/or in contact with the second phase 4 of the multiphase borehole fluids within the borehole 12.

The first resistivity measurements and/or the second resistivity measurements (hereinafter "the first and second resistivity measurements") may be transmitted from the tool 38 to the surface 20 via the telemetry system 46. The first and second resistivity measurements may be processed by the tool 38 and/or the processor 35 at the surface 20, and amounts of resistance associated with the first and second resistivity measurements may be determined. Differences in the amount of resistance associated with the phases 2, 4 may also be determined based on the first and second resistivity measurements.

Based on the detected temperature and/or resistivity measurements for the phases 2, 4, the processor 35 and/or the operator may determine that the second phase 4 comprises lesser conductive and/or formation fluids, such as, for example, a gas, and that the first phase 2 comprises conductive and/or drilling fluids, such as, for example, water or water-gas mixture. As a result, it may be determined that an influx of formation fluids is present in the borehole 12 based on the detected temperature and/or resistivity measurements. Additionally, a fraction of the borehole (i.e., the second portion of the borehole 12) occupied with the second phase 4 may be determined based on the detected temperature and/or resistivity measurements. Moreover, fluid dynamics and fluid properties associated with the phases 2, 4 in the multiphase borehole fluids within the borehole 12 may be determined based on the detected temperature and/or resistivity measurements detected.

While being rotated, the tool 36 and resistivity sensor 39 may be positioned or located adjacent to the formation cuttings 302 shown in FIG. 5. The resistivity sensor 39 may detected, acquire and/or collect third resistivity measurements associated with the formation cuttings 302 and the first phase 2 in the multiphase borehole fluids. The third resistivity measurements may be transmitted uphole to the orienter 26 via the communication system 70 and/or to the surface 20 via the telemetry system 46. The third resistivity measurements may be processed downhole by the tool 36 and/or by the processor 35 at the surface 20. The third resistivity measurements may indicate that the formation cutting 302 may be present in the first phase 2 of the multiphase borehole fluids in the borehole 12. As a result, the operator may execute one or more environmental correction techniques and/or cleaning methods for the drilling system 10 such that the formation cutting 302 may be effectively and efficiently removed from the borehole 12 and/or the borehole 12 may be cleaned.

In embodiments, multiple resistivity sensors 39 may be positioned and/or located along the length of the BHA 24 and/or the length of one or more of the tools 34, 36, 38 as shown in FIG. 8. Alternatively, each of the tools 34, 36, 38 may include the resistivity sensor 39. The multiple resistivity sensors 39 may detect, acquire and/or collect the multiple resistivity measurements along the length of the BHA 24 and/or the length of one or more of the tools 34, 36, 38. The multiple resistivity measurements may be transmitted uphole to the surface 20 via the communication system 70 and the telemetry system 46. The multiple resistivity measurements may be processed and/or may indicate amounts and/or fractions of one or more of the phases 2, 4 in the borehole 12 along the length of the BHA 24 and/or along the length of one or more of the tools 34, 36, 38.

Figure 7:
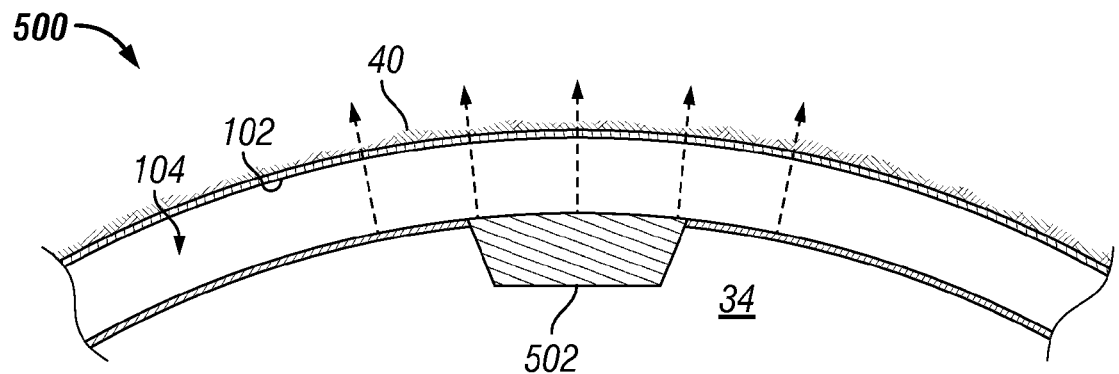
FIG. 7 illustrates a schematic cross-sectional view of the BHA in the borehole in an embodiment of the present invention.

FIG. 7 shows a system 500 comprising the tool 34 having an at least one imaging electrode 502. The tool 34 and the imaging electrode 502 may be located within the walls 102 of the borehole 12 adjacent to the formation reservoir 40. The tool 34 and the imaging electrode 502 may be rotated by the orienter 26 at the BHA rotational speed and/or may be positioned in one of the phases 2, 4 of the multiphase borehole liquids within the borehole 12. The imaging electrode 502 may be configured to generate and/or create a formation image of the walls 102 of the borehole 12, the formation reservoir 40 and/or a surrounding formation. The imaging electrode 502 may be configured to create a voltage difference two portions of the collar 206 of the tool 34. The imaging electrode 502 may be maintained at the same potential as the collar 206 of the tool 34 such that current leaving and/or discharging from the collar 206 and the electrode 502 may be focused into the walls 102 of the borehole 12, the formation reservoir 40 and/or the formation, instead of being focused in the drilling fluid. The current flowing into the imaging electrode 502 may be proportional to a resistivity of the walls 102 of the borehole 12, the formation reservoir 40 and/or formation located directly in front of and/or adjacent to the imaging electrode 502. The tool 34 may be configured to detect, acquire and/or collect the resistivity flowing into the imaging electrode 502 to produce and/or generate imaging measurements.

The imaging measurements may be transmitted uphole from the tool 34 to the surface 20 via the communication system 70 and/or the telemetry system 46. The imaging measurements may be processed downhole by the tool 34 and/or by the processor 35 at the surface 20. The imaging measurements may produce imaging associated with and/or an image of the walls 102 of the borehole 12, the formation reservoir 40 and/or the formation.

However, the tool 34 may only be capable of detecting, acquiring and/or collecting the imaging measurements when a continuous conductive phase of the multiphase borehole fluids may be directly in front of and/or adjacent to the imaging electrode. When the drilling operations of the drilling system 10 are underbalanced drilling operations, a separation of the phases 2, 4 of the multiphase borehole fluids may occur such that the second portion of the borehole 12 may be filled with the second phase 4 which may be non-conductive fluid, such as, for example, a gas. The separation of the phases 2, 4 may exist and/or may be maintained within the borehole 12 even if conductive fluids or even excess conductive fluid is pumped through the drill bit 30.

For example, while the drilling system 10 may be executing underbalanced drilling with water as the drilling fluid, formation fluids, such as, a gas, may enter the borehole 12 and may tend to occupy the second portion, such as, a top portion of the borehole 12. As a result, the tool 34 may not be capable of detecting the imaging measurements for the top portion of the borehole 12, because the second portion of the borehole is filled with formation fluids which are non-conductive fluids, such as, for example, gas.

To enable the tool 34 to detect imaging measurements for the top side of the borehole 12 when the non-conductive fluids are located direct in front of and/or adjacent to the imaging electrode 502, the drilling system 10 may replace the drilling fluid with a viscous pill 602 as shown in FIG. 8 and pump the viscous pill 602 downhole instead of the drilling fluid. Viscous pills 602 may be utilized periodically to facilitate periodic cleaning of the borehole 12. The viscous pill may be a conductive gel pill, such a water based conductive gel pill which may be pump out of the drill bit 30 and into the annulus 104 of the borehole 12. The viscous pill 602 may displace and/or move the drilling fluids of the first phase 2 and the non-conductive formation fluids of the second phase 4 within the annulus 104 of the borehole 12 as the viscous pill 602 returns to the surface 30 as shown by the arrow in FIG. 8. As a result, the viscous pill 602 may clean the annulus 104 of the borehole with the viscous pill 602 by removing non-conductive formation fluids of the second phase 4 and/or formation cuttings 302 from the borehole 12. As a result, the viscous pill 602 may allows the tool 34 to detect the imaging measurement as the viscous pill 602 moves to a position directly in front of and/or adjacent to the imaging electrode 502 of the tool 34. The present specification should not be deemed limited to a specific embodiment of the viscous pill 602.

In embodiments, the BHA 24 may include multiple tools 34, 36 along the length of the BHA 24 as shown in FIG. 8. Additionally, the BHA 24 may include multiple temperature sensors 37, multiple resistivity sensors 39 and/or multiple imaging electrodes 502 over a length of the BHA 24. As the viscous pill 602 moves uphole within the borehole 12 towards the surface 20, the viscous pill 602 may displace the non-conductive formation fluids of the second phase 4 along the length of the BHA 24. The viscous pill 602 may be positioned and/or located directly above and/or adjacent to the one or more temperature sensors 37, one or more resistivity sensors 39 and/or one or more imaging electrodes 502. As a result, the one or more temperature sensors 37, one or more resistivity sensors 39 and/or one or more imaging electrodes 502 may be capable of detecting one or more of their respective measurements as the viscous pill 602 moves uphole along the length of the BHA 24 towards the surface 20.

In one example embodiment, a method for detecting at least one phase of multiphase borehole fluids within a borehole is provided comprising: providing coiled tubing connected to a top end of a bottom hole assembly having a sensor configured to detect a property associated with the multiphase borehole fluids, positioning the sensor adjacent to a first phase of the multiphase borehole fluids by rotating the bottom hole assembly or a portion of the bottom hole assembly, detecting a first measurement with the sensor as the sensor rotates, and determining a fractional amount of at least one phase of the multiphase borehole fluids.

In one example embodiment, a method for detecting at least one phase in multiphase borehole fluids within a borehole is provided, wherein the multiphase borehole fluids comprise a drilling fluid and a formation fluid releasable from a formation that is located adjacent to the borehole, the method comprising: providing coiled tubing connected to a bottom hole assembly, wherein the bottom hole assembly is located within a borehole, wherein one of the bottom hole assembly and at least one rotatable portion of the bottom hole assembly comprises a sensor; positioning the sensor to be located adjacent to a first portion of the borehole by rotating the bottom hole assembly or the at least one rotatable portion of the bottom hole assembly at a rotational speed via an orienter connected to the bottom hole assembly, wherein the orienter is configured to rotate the bottom hole assembly or the at least one rotatable portion of the bottom hole assembly in clockwise and counter-clockwise directions, detecting a first measurement with the sensor, wherein the first measurement is based on a property associated with the first portion of the borehole, rotating the sensor such that the sensor is located adjacent to a second portion of the borehole, determining that the borehole comprises the multiphase borehole fluids based on the first measurement and a second measurement associated with the second portion of the borehole.

In one example embodiment, a method for detecting at least one phase in multiphase borehole fluids within a borehole surrounded by an underground formation is provided, wherein the borehole contains multiphase borehole fluids comprising formation fluid and drilling fluid, the method comprising providing coiled tubing connected to a bottom hole assembly, wherein the bottom hole assembly is located within the borehole and adjacent to the multiphase borehole fluids, wherein the bottom hole assembly or at least one rotatable portion of the bottom hole assembly comprises a sensor, rotating one of the bottom hole assembly and the at least one rotatable portion of the bottom hole assembly such that the sensor is located adjacent to the formation fluids in the borehole, detecting that the formation fluids comprise a gas via the sensor, displacing the formation fluids from the borehole by pumping a viscous pill into the borehole, and detecting a measurement associated with the borehole or the formation as the viscous pill passes the sensor.

It will be appreciated that various of the above-disclosed and other features and functions, or alternatives thereof, may be desirably combined into many other different systems or applications. Also, various presently unforeseen or unanticipated alternatives, modifications, variations or improvements therein may be subsequently made by those skilled in the art, and are also intended to be encompassed by the following claims.

What is claimed is:

1. A method, comprising:
   deploying a bottom hole assembly in a borehole on coiled tubing, the bottom hole assembly comprising a sensor, an imaging electrode and a drill bit;
   drilling the borehole with the coiled tubing deployed bottom hole assembly;
   circulating a drilling fluid down the coil tubing and out through the drill bit and back to the surface via an annulus between the borehole and the coil tubing;
   acquiring with the sensor a first property measurement associated with a first radial portion of the borehole at a particular axial point;
   acquiring with the sensor a second property measurement associated with a second radial portion of the borehole at the particular axial point;
   determining based on the first and the second property measurements that the borehole comprises at the particular axial point a gas phase separated from a liquid phase;
   replacing, in response to the determining, the drilling fluid with a viscous conductive pill and circulating the viscous conductive pill down the coil tubing and to the surface via the annulus to displace the gas phase from the particular axial point; and
   acquiring with the imaging electrode an imaging measurement at the particular axial point as the viscous conductive pill moves to a position directly in front of the imaging electrode.

2. The method of claim 1, wherein the first property measurement and the second property measurement are one of temperature and resistivity.

3. The method of claim 1, comprising rotating the sensor in the borehole;
   wherein the acquiring the first property measurement includes positioning the sensor adjacent to the first radial portion; and
   wherein the acquiring the second property measurement includes positioning the sensor adjacent to the second radial portion.

4. The method of claim 3, wherein the sensor is rotated at a speed of less than about five revolutions per minute and greater than about 0.05 revolutions per minute.

5. The method of claim 1, further comprising:
   acquiring a third property measurement at the particular axial point; and
   determining that formation drill cuttings are located in a radial portion of borehole at the particular axial point.

6. A method, comprising:
   positioning a bottom hole assembly at a particular axial point in a borehole surrounded by an underground formation, the bottom hole assembly comprising one or more sensors;
   acquiring property measurements at the particular axial point via the one or more sensors;
   determining that a drilling fluid occupies a first radial portion of the borehole at the particular axial point;
   determining that a formation fluid occupies a second radial portion of the borehole at the particular axial point;
   displacing the formation fluid from the second radial portion of the borehole by pumping a viscous pill into the borehole; and
   detecting a measurement associated with the underground formation at the second radial portion as the viscous pill passes the particular axial point and displaces the formation fluid.

7. The method of claim 6, wherein the acquiring the property measurements is performed while rotating the one or more sensors at the particular axial point in the borehole.

8. The method of claim 7, wherein the one or more sensors are rotated at about one revolution per minute.

9. The method of claim 7, wherein the one or more sensors are rotated at a speed of less than about five revolutions per minute and greater than about 0.05 revolutions per minute.

10. The method of claim 6, wherein the drilling fluid has a higher electrical conductivity than the formation fluid.

* * * * *